Patented Oct. 14, 1924.

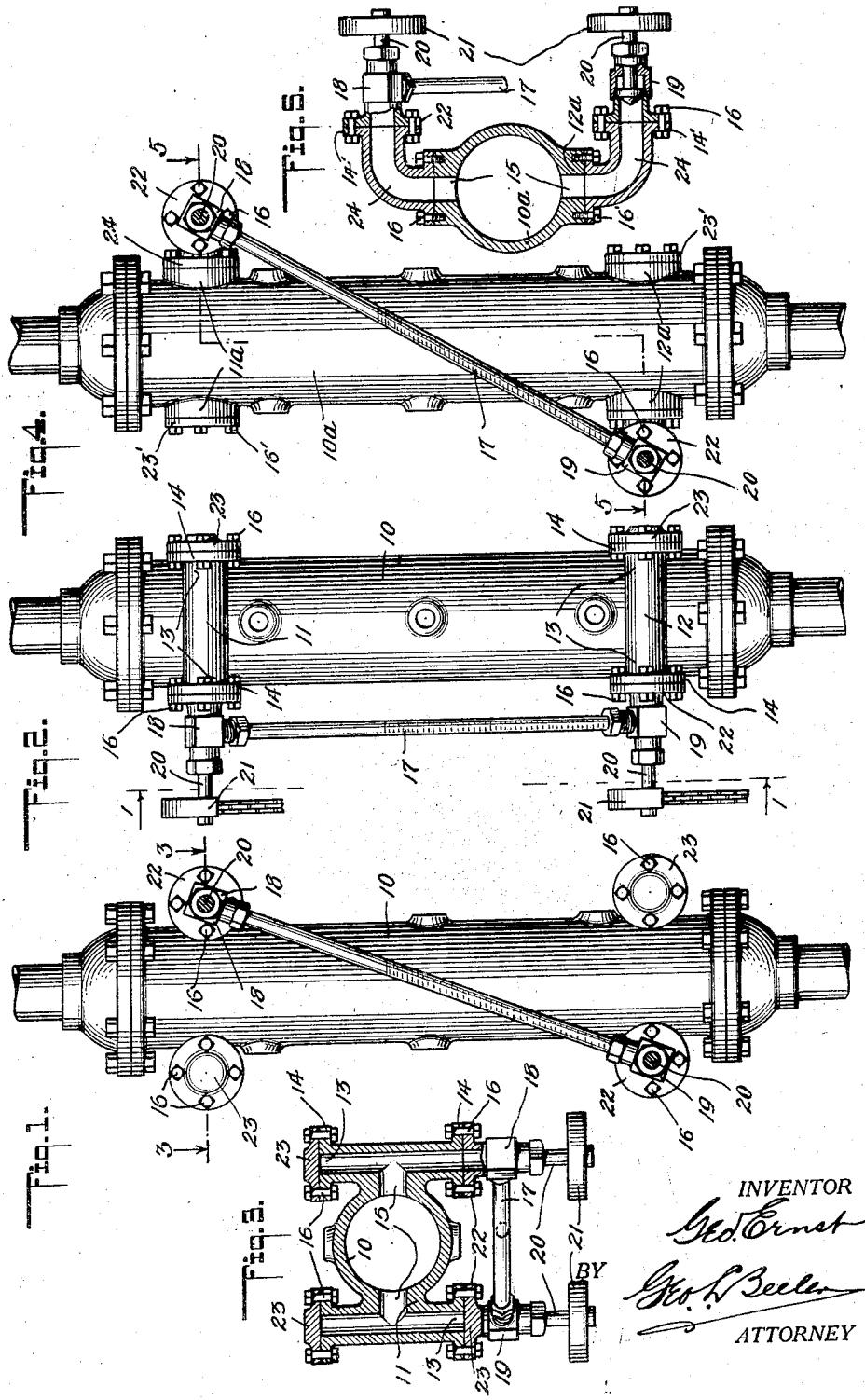

1,511,325

UNITED STATES PATENT OFFICE.

GEORGE ERNST, OF NEWARK, NEW JERSEY.

COMBINED WATER COLUMN AND INCLINED GAUGE GLASS.

Application filed February 19, 1923. Serial No. 619,862.

*To all whom it may concern:*

Be it known that I, GEORGE ERNST, a citizen of the United States, residing at Newark, in the county of Essex and State of New Jersey, have invented certain new and useful Improvements in Combined Water Columns and Inclined Gauge Glasses, of which the following is a specification.

This invention relates to steam boiler appliances and has particular reference to gauge glasses.

Among the objects of the invention is to provide a gauge glass so related or attached to a boiler or some other part of the construction as to enable the reading to be made with more precision and reliability than has been possible usually heretofore, especially in connection with those large boilers arranged at considerable elevation above the engine or boiler room. As water gauges are commonly applied or attached the sight glass or tube is vertical, and when arranged at an elevation of forty feet or so above the floor, as is frequently the case, it is difficult if not impossible to take an accurate reading of the water level. For this reason, therefore, there has been some effort made to so position the sight glass as to make it more readable at such elevations, but such attempts have not been entirely satisfactory for various reasons, as heretofore practised.

Among the objects of this present invention, therefore, is to attach the sight glass more or less directly to the water column, the sight glass being arranged preferably in a vertical plane parallel to the side or face of the water column, connections being made between the ends of the glass and portions of the column on opposite sides of its axis whereby the glass is given a pronounced inclination from the vertical, and making the water level more readable or legible than when it is vertical.

A further object of the invention is to provide a special and novel construction of water column, adapted especially for combined use with a gauge or sight glass that will be inclined with respect to the vertical.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a front elevation of a combined water column and inclined gauge glass illustrating one form of my improvement, parts being in section on the line 1—1 of Fig. 2.

Fig. 2 is a side elevation of the same construction.

Fig. 3 is a horizontal section on the line 3—3 of Fig. 1.

Fig. 4 is a front elevation of a modification.

Fig. 5 is a horizontal section of the same on the broken line 5—5 of Fig. 4.

Referring now more specifically to the drawings I show a water column 10, which in general may be of any suitable or conventional character in so far as its internal mechanism and boiler connections (not shown) are concerned, but the body or cylindrical portion thereof is specially formed to include on opposite sides and adjacent to its upper and lower ends bosses 11 and 12. These bosses may be formed as substantial duplicates of each other and duplicated also at each end of the water column. As shown especially in Fig. 3 each boss 11 and 12 has two axially aligned horizontally extending necks 13 each having a flange 14 and both of the necks being in communication through a port 15 with the interior of the column for either steam or water. The flanges 14 have smoothly dressed faces parallel to each other and are drilled for attachment screws or bolts 16.

The gauge construction includes a sight glass 17 of any suitable construction, the same being connected at its upper and lower ends to or in a pair of heads 18 and 19, each for a valve having a stem 20, to the outer end of which is attached a chain or hand wheel 21 for the manipulation thereof as is well understood and with which per se I am not particularly concerned in this instance. As clearly shown the heads 18 and 19 are arranged at opposite sides of the water column as viewed from the front and preferably at the same distance from the center of the column as viewed from the side, so that the glass 17 is inclined with respect to the vertical and lies in a plane parallel to the front of the column. The heads 18 and 19 are shown provided with flanges 22 mating with the flanges 14 above described and secured by means of the bolts 16 to the boss flanges.

The necks 13 of each boss are duplicated, and the bosses are duplicated on opposite sides of the column, for the sake of universal connection of the gauge glass to either side of the water column and for inclination in either direction, according to local conditions. Any idle neck 13, however, is sealed as by means of a disk or cap 23 secured to its flange 14 by bolts 16, so that there will be no leakage of steam or water from any of these connections. It will be noted in connection with the position of the sight glass, inclined as indicated, that an unobstructed view of the water level therein may be had from directly beneath even though chains may be used for manipulation of the valve stems. There is nothing obstructing the view of the sight glass from either beneath it or from the side as will be manifest from the drawings.

In Figs. 4 and 5 the water column 10ª is provided with bosses 11ª and 12ª adjacent to its upper and lower ends and each preferably duplicated, the duplicate bosses having ports 15 with their axes arranged diametrically of the column. Each of these bosses is tapped for stud bolts 16'.

Connected to one of the bosses 11ª and to one of the bosses 12ª on opposite sides of the water column, are a pair of tubular connections 24 each making a right angled turn and arranged in parallel horizontal planes one above the other. Each bend has a front flange 14', and to these flanges are attached the upper and lower heads 18 and 19 substantially the same as above described, the connection being made through flanges 22 and bolts 16. The sight glass 17 is accordingly attached at its upper and lower ends to the heads 18 and 19 respectively and lies in a vertical plane parallel to the front of the column, but because of the connections at opposite sides of the column the glass is inclined with respect to the vertical and so is plainly readable from beneath without the view being obscured. In this form of the invention either idle boss is sealed by means of a plate or disk 23', and by reason of the bends 24 the glass may be positioned on either side of the water column even when connected to the same bosses, simply by turning the bends over through 180° and attaching them as shown.

I claim:

1. The combination with a steam boiler water column, of a sight glass, attaching means for attaching the ends of the glass, and means on the water column to receive the aforesaid attaching means and secure the same to opposite end portions of the column and on opposite sides of the column.

2. In mechanism of the class set forth, the combination of a water column having a boss formed on one side of one end thereof and another boss on the opposite side of the other end thereof, each boss having direct communication with the interior of the column, a sight glass, a pair of heads to which the ends of the glass are attached, and means to connect the heads to said bosses, said connecting means between the heads and the bosses being of the same length whereby the sight glass is attachable to the water column in a plane parallel to one face of the column but inclined with respect to the vertical axis thereof.

3. In mechanism of the character set forth, the combination with a water column formed on opposite sides of each end with a pair of bosses having communication with the interior of the column, of a sight glass, means to connect the ends of the glass to two of said column bosses on opposite sides of the center of the column, said connections being of the same length so that the glass will lie in a plane substantially parallel to the adjacent face of the column but inclined with respect to the vertical axis thereof, and means to seal the remaining bosses not so connected with the sight glass, substantially as set forth.

In testimony whereof I affix my signature.

GEORGE ERNST.